United States Patent [19]

Fukushima et al.

[11] Patent Number: 4,757,492

[45] Date of Patent: Jul. 12, 1988

[54] METHOD FOR RECORDING AND REPRODUCING INFORMATION ON OR FROM AN OPTICAL RECORDING MEDIUM

[75] Inventors: Noburu Fukushima; Hisashi Yoshino, both of Tokyo; Masashi Sahashi; Shuichi Komatsu, both of Yokohama, all of Japan

[73] Assignee: Kabushiki Kaisha Toshiba, Kawasaki, Japan

[21] Appl. No.: 804,527

[22] Filed: Dec. 4, 1985

[30] Foreign Application Priority Data

Dec. 26, 1984 [JP] Japan .................................. 59-273313
Dec. 27, 1984 [JP] Japan .................................. 59-274095

[51] Int. Cl.$^4$ ................................................ G11B 7/24
[52] U.S. Cl. ..................................... 369/100; 369/275; 369/288; 346/76 L; 346/135.1
[58] Field of Search ............... 369/100, 275, 284, 286, 369/288; 346/135.1, 76 L

[56] References Cited

U.S. PATENT DOCUMENTS

3,971,874  7/1976  Ohta et al. ........................... 369/100

FOREIGN PATENT DOCUMENTS

53-125001  11/1978  Japan .................................. 369/275
57-094944   6/1982  Japan .................................. 369/275

OTHER PUBLICATIONS

Cuomo et al, IBM Tech. Dis. Bulletin, vol. 16, No. 1, Jun. 1973, pp. 355–356.
Doremus, "Optical Properties of Thin Metallic Films in Island Ford", Journal of Applied Physics, vol. 37, No. 7, 6/1966, pp. 2775–2781.
Patents Abstracts of Japan, vol. 5, No. 196 (P-93) (868), Dec. 12, 1981; JP-A-56 119 949, 9-19-81.
Patents Abstracts of Japan, vol. 7, No. 169 (M-231) (1314), Jul. 26, 1983; JP-A-58 74 392, 5-4-83.
Patents Abstracts of Japan, vol. 7, No. 172 (P-213) (1317), Jul. 29, 1983, & JP-A-58 77 042, 5-10-83.
Rao, et al, "Plasma Resonance in Titanium Oxide, Vanadium Oxide, and Niobium Oxide", Chemical Abstracts, vol. 75, 1971, p. 444, No. 70042s.
V. I. Boiko et al, "Plasma–Chemical Phenomena in the Oxidation of Vanadium in Air by Continuous Radiation of $CO_2$ Laser", Physics Abstracts, vol. 86, No. 1218, Oct. 17, 1983, p. 7792, Bi, 97198.
W. E. Case et al, "An Examination of Vanadium Dioxide Thin Film as an Erasable/Reuseable Medium for Optical Recording", Proceedings of SPIE Conference on Optical Storage Media, Jun. 6–10, 1983, vol. 420, pp. 168–172.
A. W. Smith, "Optical Storage in $VO_2$ Films", Appl. Phys. Lett., vol. 23, No. 8, Oct. 15, 1973, pp. 437 and 438.

Primary Examiner—Raymond F. Cardillo
Assistant Examiner—T. Hoa Nguyen
Attorney, Agent, or Firm—Foley & Lardner, Schwartz, Jeffery, Schwaab, Mack, Blumenthal & Evans

[57] ABSTRACT

A method for recording and reproducing information on or from an optical recording medium, which comprises:

recording information by illuminating light to the optical recording medium which is equipped as a recording film with a thin film comprising dispersed fine grains of a material capable of showing a metal-insulator transition to cause the metal-insulator transition owing to the heating effect of the light; and reproducing the information by utilizing changes in optical characteristics owing to a plasma resonance absorption by the fine grains dispersed in the thin film. The method of this invention permits high-density recording with high sensitivity and upon reproduction, enables reproduction of record with a high signal/noise ratio. The recording medium obtained by this method is an erasable optical recording medium, which permits its reutilization for recording and reproduction after erasure of the previously-stored record.

12 Claims, 4 Drawing Sheets

METHOD FOR RECORDING AND REPRODUCING INFORMATION ON OR FROM AN OPTICAL RECORDING MEDIUM

BACKGROUND OF THE INVENTION

This invention relates to a method for recording and reproducing an optical recording medium, and more specifically to a method for recording information on an optical recording medium, reproducing the information or erasing the information by utilizing plasma resonance absorption which takes place in the recording film of the optical recording medium upon illumination of light thereto.

Since fine grains of certain inorganic materials are equipped with such characteristics that they have high chemical reactivity, permit poor thermal diffusion and hence tend to induce concentration of heat, and are equipped with high light absorption indices, there have been proposed highly-sensitive optical recording media in each of which these fine grains are fixed as a film on a substrate. For example, Japanese Unexamined Patent Publication No. 94944/1982 discloses a method for recording and reproducing information by forming a thin recording film, which contains fine grains of various inorganic materials in a dispersed state, on a substrate and then illuminating the thin recording film with a light beam such as laser beam or electron beam so as to form, in the thin recording film, spots changed in structure, quality or color.

On the other hand, Japanese Unexamined Patent Publication No. 74392/1983 discloses a method for illuminating an isle-like cohesive film of fine grains of a metal or sub-metal with a laser beam, whereby the illuminated spots are caused to fuse or evaporate to form sunk pits there.

In the above-mentioned optical recording media, the fine grains or the recording films which contain such fine grains undergo irreversible changes upon their recording. Once information has been recorded by illumination of light, it will be impossible to erase the thus-recorded information. In other words, such conventional optical recording media are thus accompanied by a problem that they do not permit repeated utilization.

SUMMARY OF THE INVENTION

An object of this invention is to improve the above-mentioned problem in the prior art techniques and to provide a method for recording information on an optical recording medium, reproducing the information and erasing the information, in which the optical recording medium assures high sensitivity upon its recording, produces a large signal/noise ratio (S/N ratio) upon its reproduction, and permits erasure of recorded information owing to the dispersed inclusion of fine grains of a material, which shows a reversible metal-insulator transition upon illumination of light thereto, in its recording film. That is to say, there is thus provided a method for recording and reproducing information on or from an optical recording medium, which comprises:

recording information by illuminating light to the optical recording medium which is equipped as a recording film with a thin film comprising dispersed fine grains of a material capable of showing a metal-insulator transition to cause the metal-insulator transition owing to the heating effect of the light; and reproducing the information by utilizing changes in optical characteristics owing to a plasma resonance absorption by the fine grains dispersed in the thin film.

DESCRIPTION OF THE PREFERRED EMBODIMENTS

Figure 1:
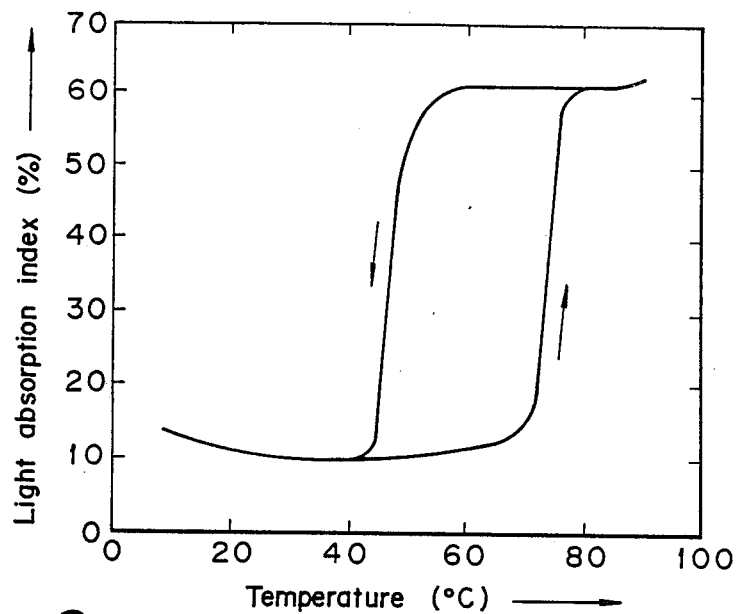
FIG. 1 diagrammatically illustrates the dependence of the light absorption of the thin film of Example 1 on temperature.

In the course of proceeding with an intensive research with a view toward achieving the above-described object, it came to the attention of the inventors that in the case of a film of fine grains of a metal or the like dispersed on a medium or a film of isle-like fine grains of such a material deposited in a discontinuous pattern on a substrate, illumination of light to the film causes the electrons of the fine grains to undergo a collective motion and as a result, plasma resonance absorption is caused by the dispersed fine grains, thereby to induce absorption of the light; and the absorbable wavelength range and absorption coefficient in the absorption of the light are dependent on certain properties of the medium or substrate, the space occupancy of the fine grains, the grain size of the fine grains, and some electrical properties, especially, the free electron concentration and the electron effective mass of the fine grains.

It also came to the knowledge of the present inventors that where fine grains are made of a material capable of exhibiting a metal-insulator transition, the film causes plasma resonance absorption to induce significant absorption at wavelengths ranging from the infrared region to the visible light region upon illumination of light to the film when the material is in its metal phase, the free electron concentration is high and effective mass is small. When the material is in its insulator phase, no plasma resonance absorption takes place by illumination of light because the free electron concentration is low and effective mass is large. In other words, the film which contains the fine grains of the material capable of showing the metal-insulator transition may or may not induce plasma resonance absorption upon illumination of light depending on the type of the phase of the fine granular material.

The term "metal-insulator transition" as used herein means such a phenomenon that in the course of temperature changes, a compound causes a change in crystalline structure or lattice constants and concurrently with the change, the state of electrons in the compound, namely, its electron energy band pattern or energy level pattern is also changed. As a result, the manner of electrical conduction through the compound is changed and the concentration of conduction electrons is either increased or decreased abruptly to result in a change in electrical conductivity.

Illustrative of the material capable of showing such a metal-insulator transition may include oxides and sulfides of transition elements, etc. As exemplary oxides, may be mentioned $VO_2$, $V_2O_3$, $VO$, $Ti_2O_3$, $Fe_3O_4$ and so on. On the other hand, NiS may be mentioned as such a sulfide by way of example. Such materials are however not limited to these oxides and sulfides, but there are materials showing abrupt changes in electrical conductivity due to their metal-insulator transition even in the field of organic polymers.

Accordingly, the present inventors came up with an idea that signals can be recorded when a thin film 1 containing such fine grains 2 is fixed on a substrate 3. Light 4a from source 4 is illuminated onto the thin film 1 to cause the fine grains 2 to undergo a metal-insulator transition at the illuminated spots owing to the heating effect of the light energy. The absorbable wavelength and absorption coefficient of plasma resonance absorption of the thin film are changed at that time. Recorded information can be reproduced when light of the wavelength of the plasma resonance absorption is caused to transmit through the thin film and the occurrence or non-occurrence of light absorption is read by detector 6. When the light-illuminated spots are cooled, a phase transition opposite to the above phase transition takes place to erase the recorded signals, whereby the fine granular material returns to its original state before the illumination of the light. Based on the above idea, the method of this invention has been brought to completion.

First of all, in an optical recording medium to which the method of this invention is applied, its recording film is a film of fine grains of a material capable of showing a metal-insulator transition, said fine grains being dispersed in a medium and being fixed on a substrate, or a film of so-called isle-like fine grains discontinuously deposited on a substrate.

As materials forming, as fine grains, these films and showing metal-insulator transitions, it is desirable to employ materials which undergo significant changes in free electron concentration and effective mass upon such transitions. For practical use, those having transition temperatures around room temperature are more preferable.

As such materials, may be mentioned materials represented by the following formula:

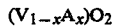
$(V_{1-x}A_x)O_2$ wherein A means at least one of molybdenum and tungsten and x stands for a number satisfying $0 \leq x < 0.1$; and materials represented by the following formula:

$(V_{1-y}B_y)_2O_3$ wherein B denotes at least one of chromium and aluminum and y stands for a number satisfying $0 > y > 0.03$.

The former materials have transition temperatures in the neighborhood of 70° C. They are of insulator phases on the lower temperature side and of metal phases on the higher temperature side. When they are illuminated to heat them at the illuminated spots, the illuminated spots are thus turned to metal phases and exhibit plasma resonance absorption. This phenomenon does not take place in their insulator phases. Mo and W are components which can shift the phase transition temperatures of these materials to the lower sides. They are thus effective in maintaining their recorded state in a low temperature range which will be described herein.

The transition temperatures of the latter material vary within the range of −20° C. to 150° C. depending on their values of y. When y=0 or ≦0.03, they do not undergo metal-insulator transition. On the lower temperature side, they are of metal phases. On the other hand, they are of insulator phases on the higher temperature side. Although Cr and Al can still exhibit its effect even if its content is at a lower level, $x \leq 0.0001$ is preferred for practical application.

In order to form a recording film with one of such materials, it is only necessary to apply any one of various conventional film-forming techniques to a substrate. For example, in the case of the latter film, a V-Cr alloy, V-Al alloy or V-Cr-Al alloy of a prescribed composition may be vacuum-deposited at a low partial pressure of oxygen or to subject V to reactive evaporation or sputtering at a low partial pressure of oxygen.

It is possible to form a thin film with fine grains contained in a discontinuous isle-like pattern by making suitable selections as to such conditions as the evaporation source, target composition, atmosphere, and substrate temperature and arrangement in the film-forming process. It is also possible to form another thin film with fine grains of $(V_{1-y}B_y)_2O_3$ dispersed in a dispersing medium by using, as an evaporation source or target, one of various glass composition, $SnO_2$, $CaF_2$ and organic substances such as PMA (dispersing media) and evaporating or sputtering it alternately with the material of $(V_{1-y}B_y)_2O_3$ or combining polymerization by vapor phase method. Depending on the setting of conditions, it is also possible to form a further thin film by superposing both of the above-described thin films one over the other.

Of these isle-like thin films, the film of dispersed fine grains has a low thermal conductivity because the space occupancy of the fine grains in the thin film is small. As a result, it exhibits high sensitivity to illuminated light when its temperature is raised by the illumination of light upon recording, thereby permitting the use of a low output light source such as semiconductor laser. For similar reasons, the light-illuminated spots are prevented from expanding by thermal diffusion and high-density recording is thus feasible.

In such thin films, the sizes of fine grains may be controlled within 50 to 7000 Å, preferably 100 to 800 Å or most preferably 200 to 700 Å because it is desired for the fine grains to have grain sizes smaller than the wave length of light to be used for reproduction so that the light is prevented from being scattered. On the other hand, the volume occupancy of the fine grains in each thin film may be set within 10 to 80%, preferably 20 to 70%, or most preferably 30 to 60%.

Turning to the film thickness, any suitable thickness may be chosen depending on the wavelength of a light source to be used for reproduction, the manner of reproduction, namely, whether upon detection of light, light is detected on the side opposite to the light source after its transmission, through the thin film or a reflective layer is provided between the thin film and substrate and light is detected on the side of the light source after the backward transmission of reflected light through the thin film, the grain sizes of the fine grains, and the difference of volume occupancy of the fine grains. However, the thickness is generally set within 0.5 to 50 μm, preferably 1 to 20 μm. Thin films of the other type, namely, thin films of cohesive fine grains have the same advantages as the above-described thin films of dispersed fine grains and allow high-density recording. In each of these thin films of cohesive fine grains, the grain sizes of the fine grains are preferably smaller than the wavelength of light to be employed for reproduction and may thus be set within 50 to 10000 Å, preferably 100 to 8000 Å, most preferably 200 to 7000 Å. On the other hand, the volume occupancy of the fine grains of the material in the thin film of the cohesive fine grains may be set 80% or more, desirably 90% or more. In the thin film of the cohesive fine grains, it is desirable that the gaps among the fine grains are filled with a material such as $CaF_2$ or the like from the viewpoint of weatherability.

Although its film thickness may vary depending whether transmitted light or light reflected by the substrate is used upon recording or reproducing, it may be set within 0.5 to 10 μm, preferably 1 to 6 μm.

Recording and reproduction can be performed in the following manner, using such an optical recording medium as those mentioned above. First of all, light is illuminated onto the thin film. The light-illuminated spots are thus heated so that their temperature increases. At the transitional temperature, a metal-insulator transition takes place there. It is here that information has been stored by virtue of the phase transition of the corresponding fine grains.

Thereafter, the illumination of light is stopped and the optical recording medium is cooled to room temperature. It should be noted that with respect to the metal-insulator transition of the above material, the transition temperature in its heating cycle and that in its cooling cycle are not the same. Namely, the temperature hysteresis exists on its phase transition.

Since the transition temperature in its cooling cycle is shifted toward the lower temperature side compared with the transition temperature in its heating cycle, the record, namely, the light-illuminated spots are allowed to remain in the phase transformed by the illumination of light even during the cooling cycle. Accordingly, the thin film is kept in its recorded state.

The reproduction of record can be carried out in the following manner. Supposing that the fine grains in the illuminated spots are of a metal phase for example, plasma resonance absorption takes place at these spots. Then, light having a wavelength absorbable by the plasma resonance absorption is illuminated to detect whether the transmitted light has been absorbed or not.

If the fine grains are cooled beyond their transition temperature in the cooling cycle, the illuminated spots regain their phase before the illumination of light and the record is hence erased. Namely, the above recording media permit rewriting of recorded information and repeated recording and reproduction.

The transition temperature of such a fine granular material in its cooling cycle varies depending on the cooling rate. When a spot which has been illuminated and is thus in a recorded state is cooled rapidly, the recorded state is maintained to a temperature lower than the transition temperature in its normal cooling cycle and in other words, is frozen. This phenomenon is considered to occur when a laser beam is focused down to an extremely small diameter upon illumination and the thus-illuminated spot undergoes rapid cooling relative to its peripheral area in the cooling cycle.

Utilizing this phenomenon, it is possible to maintain illuminated spots of such an optical recording medium in their recorded state by cooling it rapidly after recording and upon erasing the record, to have the illuminated spots undergo a phase transition at its transition temperature in the normal cooling cycle by heating the recording medium and then slowly cooling same provided that a material of a composition, the transition temperature of which falls right on room temperature in the slow cooling cycle, is chosen for the optical recording medium. Namely, it is possible to proceed with the recording, reproducing and erasing operations without need for any special cooling facilities.

This invention will be further described by the following examples.

EXAMPLE 1

In an argon atmosphere having an oxygen partial pressure of $2 \times 10^{-3}$ Torr, a quartz substrate cooled by liquefied nitrogen was subjected for 20 seconds to vacuum evaporation using metallic vanadium as an evaporation source. Thereafter, further vacuum evaporation was applied for 60 seconds using boron trioxide ($B_2O_3$) as an evaporation source. The above operations were repeated 12 times to form a thin film having a thickness of 1.5 μm on the quartz substrate. An electron microscopic observation of the thin film indicated that the thin film was a film of scattered fine grains in which fine $VO_2$ grains having grain sizes in the range of 200 to 400 Å were distributed with spacings of 400 to 600 Å in $B_2O_3$.

Light of a wavelength of 1.06 μm was illuminated onto the thin film to determine the relation between its light absorption index and temperature. Results are shown in FIG. 1. As readily envisaged from the diagram, the transition to the metal phase took place at about 70° C. in the heating cycle while the reverse transition took place at about 43° C. in the cooling cycle. At both transitions, the light absorption index changed considerably.

Then, a semiconductor laser (wavelength: 830 nm; output: 10 mW) having a spot size of about 3 μm in diameter was illuminated onto the thin film. The light absorption indices of the illuminated spots (recorded spots), an unilluminated area (unrecorded area) and another area (erased area), which had been obtained by cooling some of the recorded spots to 10° C., were respectively measured by a laser beam having a wavelength of 1.06 μm and an output of 0.1 mW. Incidentally, the measurement was effected at 50° C. The light absorption indices of the recorded spots, unrecorded area and erased area were 53.2%, 11.2% and 11.5% respectively. It was thus found that the light absorption index changed significantly along with the metal-insulator transition induced by the illumination of light to perform recording and the record was erased upon cooling.

EXAMPLE 2

A thin film having a thickness of 1.5 μm thick was formed in the same manner as in Example 1 except that the oxygen partial pressure was $1\times 10^{-4}$ Torr and the evaporation sources were $V_{0.990}Cr_{0.010}$ and $B_2O_3$ respectively. The thin film was a film of dispersed fine grains in which fine grains of $(V_{0.990}Cr_{0.010})_2O_3$ having a grain size of 200 to 300 Å were distributed with spacings of 400 to 600 Å in $B_2O_3$.

Figure 2:
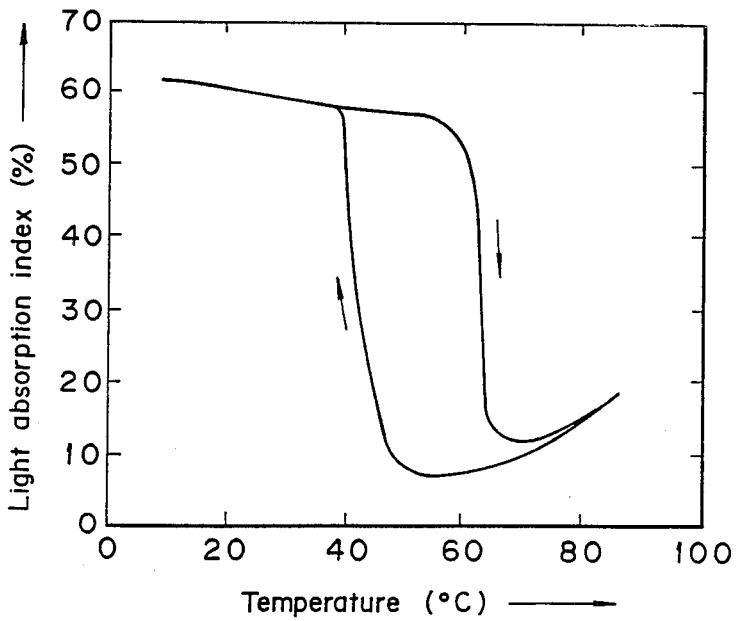
FIG. 2 diagrammatically illustrates the dependence of the light absorption of the thin film of Example 2 on temperature.

A semiconductor laser beam having a wavelength of 1.06 µm was illuminated onto the thin film to determine the relation between its light absorption index and temperature. Results are shown in FIG. 2.

Then, a semiconductor laser beam (wavelength: 830 nm; output: 10 mW) having a spot size of about 3 µm in diameter was illuminated onto the thin film to form recorded spots. An area containing the recorded spots was then illuminated by a semiconductor laser beam (output: 10 mW; wavelength: 830 nm) having a spot diameter of 20 µm and the thus-illuminated area was slowly cooled as was, thereby forming an erased area. Under the same conditions as those employed in Example 1 except for a measurement temperature of 25° C., the light absorption indices of respective spots of area were measured. The light absorption indices of the recorded spot, unrecorded area and erased area were 9.8%, 58.2% and 57.9% respectively.

Namely, the recorded spots had the smaller light absorption index because the insulator phase was kept frozen to room temperature and no plasma resonance absorption took place. On the other hand, the light absorption index became greater owing to plasma resonance absorption at the erased area which was of the metal phase.

EXAMPLE 3

An RF sputtering was carried out by alternately using vanadium with minute pieces of Mo and W placed thereon as "Target I" and $CaF_2$ as "Target II" in a nitrogen atmosphere of $3\times 10^{-4}$ Torr which contained 5% of oxygen. As a substrate, was used a quartz substrate which was cooled with liquefied nitrogen. Each sputtering operation was effected for 1 minute. The two targets were alternately sputtered 120 times, thereby forming a thin film having a thickness of 2.0 µm. Upon an electron microscopic observation of the thin film, the thin film was found to be a film of dispersed fine grains in which $VO_2$ grains having grain sizes of 300 to 400 Å were distributed with spacings of 400 to 600 Å in $CaF_2$. Since a film obtained by continuously sputtering Target I only was found to have a composition of $(V_{0.991}Mo_{0.006}W_{0.003})O_2$ as a result of its composition analysis, the $VO_2$ grains constituting the thin film of the dispersed fine grains were believed to have the same composition.

Figure 3:
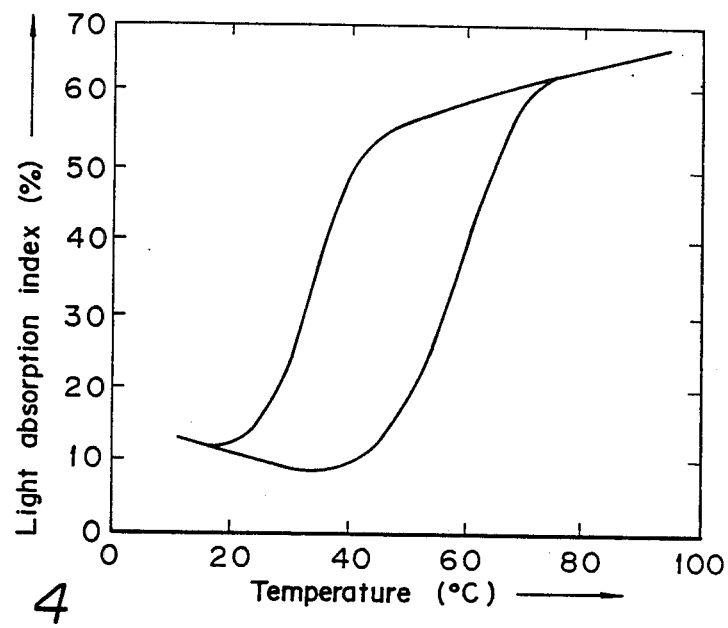
FIG. 3 diagrammatically illustrates the dependence of the light absorption of the thin film of Example 3 on temperature.

Using the above thin film, the changes of the temperature depending on its light absorption index was measured under the same conditions as those employed in Example 1. Results are shown in FIG. 3.

Using a laser of an output of 10 mW, recorded spots were formed in the same manner as in Example 1. Following the procedure of Example 1, some of the thus-recorded spots were cooled to 10° C. so that an erased area was also formed. Their light absorption indices were measured along with the light absorption index of its unrecorded area at 30° C. by means of a laser beam the output of which was 0.1 mW. The light absorption indices of the recorded spots, unrecorded area and erased area were 48.8%, 9.2% and 10.1% respectively.

EXAMPLE 4

Under the same conditions as those used in Example 2, thin films having a thickness of 1.5 µm were formed by using $V_{0.990}Al_{0.010}$ and $B_2O_3$, and $V_{0.990}Cr_{0.006}Al_{0.004}$ and $B_2O_3$ as their respective evaporation sources. The relations between the light absorption indices of these thin films and temperature were investigated under the same conditions as those used in Example 2. Results were substantially the same as those obtained in Example 2. Furthermore, under the same conditions as those used in Example 2, recorded spots and erased areas were respectively formed on these thin films. Their light absorption indices were then measured along with those of the unrecorded areas. As a result, the respective light absorption indices were found to be 10.2% at the recorded spots, 60.0% at the unrecorded area and 58.2% at the erased area in the case of the thin film obtained from the use of $V_{0.990}Al_{0.010}$ as an evaporation source and 9.2% at the recorded spots, 58.9% at the unrecorded area and 60.1% at the erased area in the case of the thin film obtained from the use of $V_{0.990}Cr_{0.006}Al_{0.003}$ as an evaporation source.

EXAMPLE 5

A quartz substrate was supported in a DC planar magnetron sputtering apparatus and the temperature of the substrate was maintained at 250° C. Using as a target metallic vanadium with minute pieces of metallic chromium placed fixedly thereon, sputtering was effected in an argon atmosphere in which 1.5 vol. % of oxygen was contained. A thin film, which had been obtained after conducting the above sputtering operation for 15 minutes, was subjected to a heat treatment at 600° C., for 1 hour in a hydrogen gas stream. An optical recording medium of this invention was obtained with a thin film deposited fixedly on the quartz substrate, the composition and average thickness of which film were $(V_{0.9920}Cr_{0.0080})_2O_3$ and 1.0 µm respectively.

Figure 4:
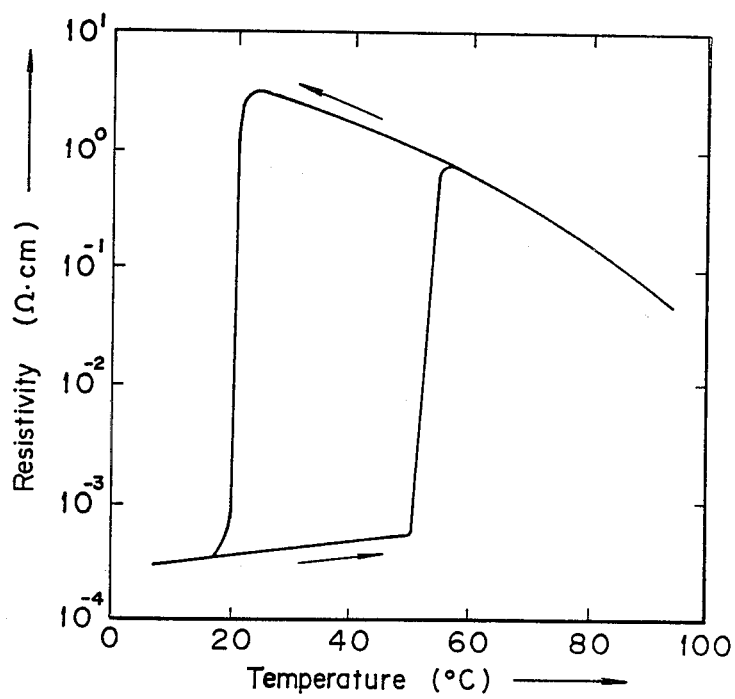
FIG. 4 diagrammatically shows the dependence of the resistivity of a thin film of Example 5 upon temperature.

Electrodes were then connected to the thin film. The dependence of its resistivity upon temperature was measured by changing its temperature at a rate of 10° C./min. in both heating and cooling cycles. Measurement results are shown in FIG. 4. As apparent from FIG. 4, it was found that the thin film underwent a metal-insulator transition at 50° C. in the heating cycle and at 10° C. in the cooling cycle.

Figure 5:
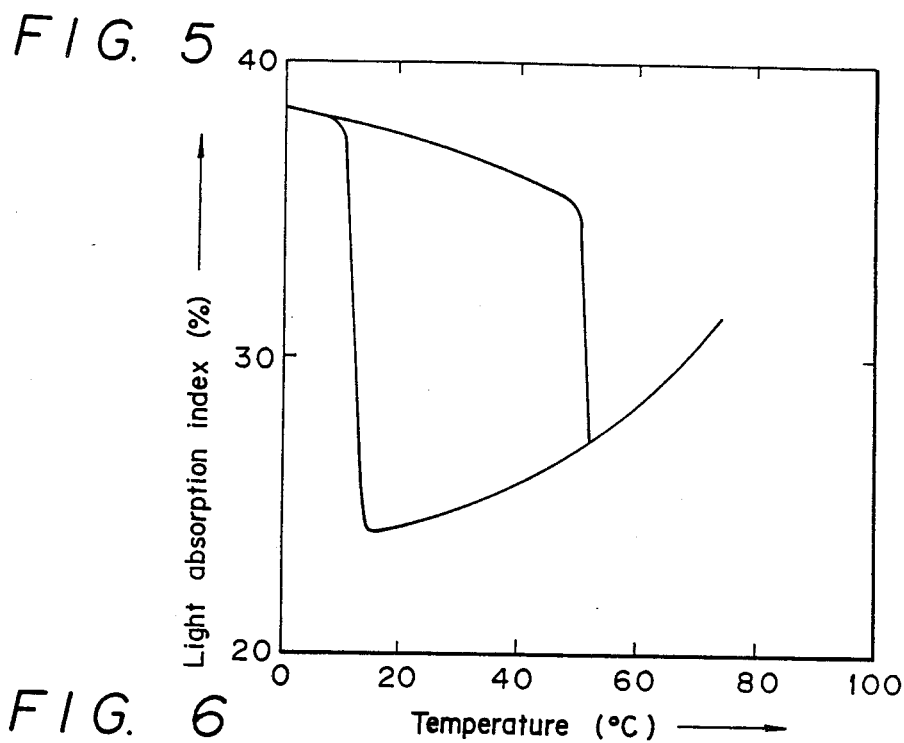
FIG. 5 diagrammatically shows the dependence of the light absorption of a thin film of Example 5 upon temperature.

A laser beam having a wavelength of 770 nm was illuminated onto the thin film and the dependence of its light absorption index upon temperature was measured. Results are shown in FIG. 5.

Thereafter, a semiconductor laser (wavelength: 830 nm; output: 20 mW) having a spot size of about 3 µm in diameter was illuminated onto the thin film. By using a laser beam having a wavelength of 770 nm and an output of 1 mW, its light absorption index was measured at illuminated spots (recorded spots), an unilluminated area (unrecorded area) and another area (erased area) which had been obtained by cooling some of the recorded spots to 0° C. Incidentally, the measurement was effected at 25° C. The light absorption indices of the recorded spots, unrecorded area and erased area were 24%, 37% and 38% respectively. It was thus found that the light absorption index changed significantly due to the metal-insulator transition induced by the illumination of light to perform recording and the record was erased upon cooling.

EXAMPLE 6

Using an alloy having a composition of $V_{0.99}Cr_{0.01}$ as an evaporation source, it was deposited on a quartz substrate, which was cooled with liquefied nitrogen, at an oxygen partial pressure of $1 \times 10^4$ Torr. On the quartz substrate, an isle-like film of cohesive fine grains having a composition of $(V_{0.9940}Cr_{0.0060})_2O_3$ and grain sizes of 200 to 300 Å was formed to a thickness of 1.5 μm.

Figure 6:
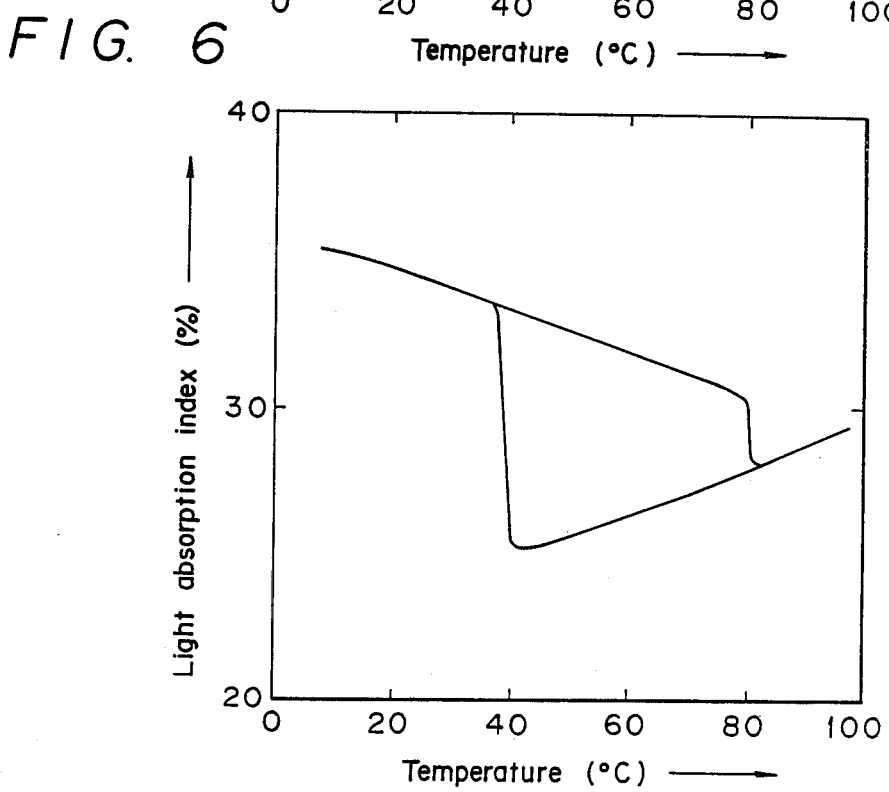
FIG. 6 diagrammatically illustrates the dependence of the light absorption of the thin film of Example 6 on temperature.
Figure 7:
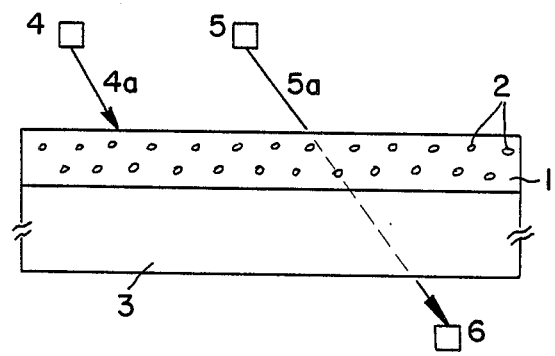
FIG. 7 is a cross-sectional view of the recording medium of the present invention and graphical representations of the recording and reproducing elements.
Figure 8:
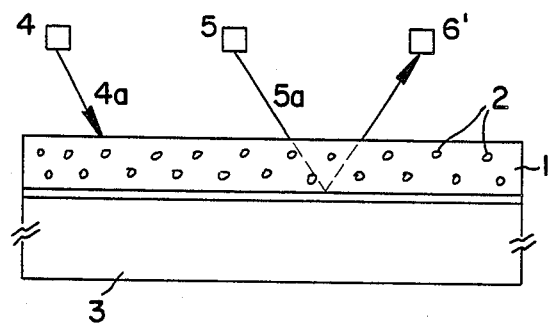
FIG. 8 is a cross-sectional view of an alternative embodiment of the recording medium of the present invention and graphical representations of the recording and reproducing elements.

The dependence of the light absorption index of the film upon temperature was measured in the same manner as in Example 5. Measurement results are shown in FIG. 6. The transition temperature was 80° C. in the heating cycle and 40° C. in the cooling cycle.

A semiconductor laser beam (wavelength: 830 μm; output: 10 mW) having a spot size of about 3 μm in diameter was illuminated onto the thin film to form recorded spots. An area containing the recorded spots was then illuminated by a semiconductor laser beam (output: 10 mW; wavelength: 830 nm) having a spot diameter of 20 μm and the thus-illuminated area was cooled slowly as was, thereby forming an erased area.

Under the same conditions as those employed in Example 5, the light absorption indices of the respective spots and areas were measured. They were 25% at the recorded spots, 35% at the unrecorded area and 35% at the erased area.

The recorded spots had the smaller light absorption index because the insulator phase was maintained at room temperature as was. On the other hand, the light absorption index was great at both unrecorded and erased areas which were of the metal phase.

As appreciated from the foregoing description, this invention is directed to a recording and reproducing method, which utilizes plasma resonance absorption of a thin film of fine grains of a material capable of showing a metal-insulator transition. The method of this invention permits high-density recording with high sensitivity and upon reproduction, enables reproduction of record with a high signal/noise ratio.

Since the optical recording medium utilizes a reversible metal-insulator transition of the fine granular material, the recording medium is an erasable optical recording medium, which permits its reutilization for recording and reproduction after erasure of the previously-stored record, and is thus useful.

What is claimed is:

1. A method for recording and reproducing information on or from an erasable optical recording medium, which comprises;
   recording information by illuminating light to the optical recording medium which is equipped as a recording film with a thin film comprising dispersed fine grains of a material capable of showing a metal-insulator transition to cause the metal-insulator transition owing to the heating effect of the light; and
   reproducing the information by transmitting light energy to the thin film and detecting the occurrence or non-occurrence of light absorption by the fine grains dispersed in the thin film wherein the dispersed fine grains have grain sizes in the range of 200 to 400 angstroms and are distributed with spacings of 400 to 600 angstrom between the grains.

2. The method according to claim 1, wherein the material is represented by the following formula:

$$(V_{1-x}A_x)O_2$$

wherein A is at least one of molybdenum and tungsten and x is a number satisfying $0 \leq x < 0.1$.

3. The method according to claim 1, wherein the material is represented by the following formula:

$$(V_{1-y}B_y)_2O_3$$

wherein B is at least one of chromium and aluminum and y is a number satisfying $0 < y < 0.03$.

4. The method according to claim 1, wherein the dispersed fine grains have a grain size within the range of from 50 to 7000 Å, the volume occupancy of the dispersed fine grains in the thin film is within the range of from 10 to 80% and the thin film has a thickness within the range of from 0.5 to 50 μm.

5. The method according to claim 1, wherein the fine grains form a discontinuous isle-like pattern.

6. The method according to claim 1, wherein the fine grains are dispersed in $CaF_2$.

7. The method according to claim 1, wherein the fine grains are dispersed in $B_2O_3$.

8. The method according to claim 1, wherein the dispersed fine grains have grain sizes in the range of 200 to 300 Angstroms.

9. The method according to claim 1 wherein the volume occupancy of the fine grains is within the range from 10 to 80%.

10. The method according to claim 9 wherein the volume occupancy of the fine grains is within the range from 20 to 70%.

11. The method according to claim 10 wherein the volume occupancy of the fine grains is within the range from 30 to 60%.

12. A method for recording and reproducing information on or from an erasable optical recording medium, which comprises;
    recording information by illuminating an optical recording medium consisting essentially of a substrate having a thin film of dispersed fine grains of a material capable of showing a metal-insulator transition to cause the metal-insulator transition owing to the heating effect of the light; and
    reproducing the information by transmitting light energy to the thin film and detecting the occurrence or non-occurrence of light absorption by the fine grains dispersed in the thin film wherein the dispersed fine grains have grain sizes in the range of 200 to 400 angstroms and are distributed with spacings of 400 to 600 angstrom between the grains.

* * * * *